United States Patent [19]

Zurcher et al.

[11] E Re. 29,551

[45] Reissued Feb. 28, 1978

[54] ELECTRONIC WATCH MOVEMENT MOUNTING AND CONNECTION

[75] Inventors: Rudolf F. Zurcher; I. Benjamin Merles, both of Newport Beach, Calif.

[73] Assignee: Hughes Aircraft Company, Culver City, Calif.

[21] Appl. No.: 632,612

[22] Filed: Nov. 17, 1975

Related U.S. Patent Documents

Reissue of:

[64] Patent No.: 3,838,568
Issued: Oct. 1, 1974
Appl. No.: 343,319
Filed: Mar. 21, 1973

[51] Int. Cl.[2] ..... G04B 37/00

[52] U.S. Cl. ..... 58/88 C; 58/23 R; 58/50 R; 58/23 BA

[58] Field of Search ..... 73/430; 58/23 R, 57, 58/88 R, 88 C, 88 E, 105, 90 R, 23 BA, 85.5, 55, 50 R

[56] References Cited

U.S. PATENT DOCUMENTS

| | | | |
|---|---|---|---|
| 1,544,932 | 7/1925 | Peterson | 58/88 C |
| 1,582,733 | 4/1926 | Clark | 58/88 C |
| 1,786,061 | 12/1930 | Gruber | 58/88 C |
| 2,044,752 | 6/1936 | Dunlap | 58/88 C |
| 3,216,188 | 11/1965 | Hirose et al. | 58/23 D |
| 3,540,207 | 11/1970 | Keeler | 58/23 R |
| 3,597,913 | 8/1971 | Fujimori | 58/23 BA |
| 3,735,584 | 5/1973 | Tokunaga | 58/88 C |
| 3,748,845 | 4/1973 | Mutter et al. | 58/23 A |
| 3,759,031 | 9/1973 | McCullough et al. | 58/23 R X |
| 3,762,153 | 10/1973 | Komiyama et al. | 58/63 X |

*Primary Examiner*—Ulysses Weldon
*Attorney, Agent, or Firm*—W. H. MacAllister; Allen A. Dicke, Jr.

[57] ABSTRACT

Electronic watch movement is principally electronics mounted upon a substrate. The substrate is mounted with respect to the watchcase so that it can laterally shift in response to lateral shock. Springs are mounted on the substrate and resiliently center the substrate. At least one of these springs is electrically connected to the circuitry on the substrate and is contactable by an externally actuatable push-button so that external action on the watchcase can result in electrical changes in the electronic circuit of the watch movement.

23 Claims, 5 Drawing Figures

ELECTRONIC WATCH MOVEMENT MOUNTING AND CONNECTION

Matter enclosed in heavy brackets [ ] appears in the original patent but forms no part of this reissue specification; matter printed in italics indicates the additions made by reissue.

BACKGROUND

This invention is directed to an electronic watch movement mounting to reduce mechanical shock transmitted from the case to the watch movement and also to provide electrical connection from the exterior of the case to the electronic circuit of the watch movement.

Electronic watches are a complex evolvement incorporating both the century-old experience and tradition of the watchmaking industry, plus the fairly recent developments of electronics and especially microelectronics developments. Most of the micro-electonics have been designed and developed for military or space purposes. It has been this progress, that continues to bring advances into the commercial and consumer marketplace. In the present instance, large scale integration chips are known. They are interconnected by means of printed circuits and substrates, and, in high performance environment where the external ambient may vary over broad ranges, specifications usually call for encapsulation of the entire substrate with the chips carried thereon.

In prior commercial electronic watch movements, no protection in addition to the usual watchcase closure has been provided to the electronic components. Furthermore, no shock or vibration isolation has been provided in the prior art electronic watch structures.

SUMMARY

In order to aid in the understanding of this invention, it can be stated in essentially summary form that it is directed to an electronic watch movement mounting for shock and vibration absorption and electric connection means for the electronic circuit. The electronic circuit comprises a printed circuit on a substrate with integrated circuit chips mounted on the front thereof. The substrate is mounted for lateral motion within the watchcase, while springs mounted on the substrate urge the substrate to a centered position. By this means, lateral shock on the watchcase is not directly conveyed to the substrate. At least one spring is electrically connected to the electronic watch circuit, and a pushbutton in the case can be manually depressed to engage the spring to make electric contact.

Accordingly, it is an object of this invention to provide an electronic watch movement where mounting and connection for the watch movement are provided. It is a further object to structure the mounting of an electronic watch movement so that the movement is isolated from the case with respect to shock and vibration. It is a further object to provide an electronic watch movement wherein the mounting incorporates the electrical connections from the case to the circuitry of the movement. It is yet another object to provide a mounting for an electronic watch movement wherein springs are employed for resiliently mounting the watch movement with respect to the case, and the springs are electrically connected to the circuitry of the movement so that switch plungers in the case can contact the springs to cause electrical connections.

Further objects and advantages of this invention will become apparent from the study of the following portion of the specification, the claims and the attached drawings.

DESCRIPTION

Figure 1:
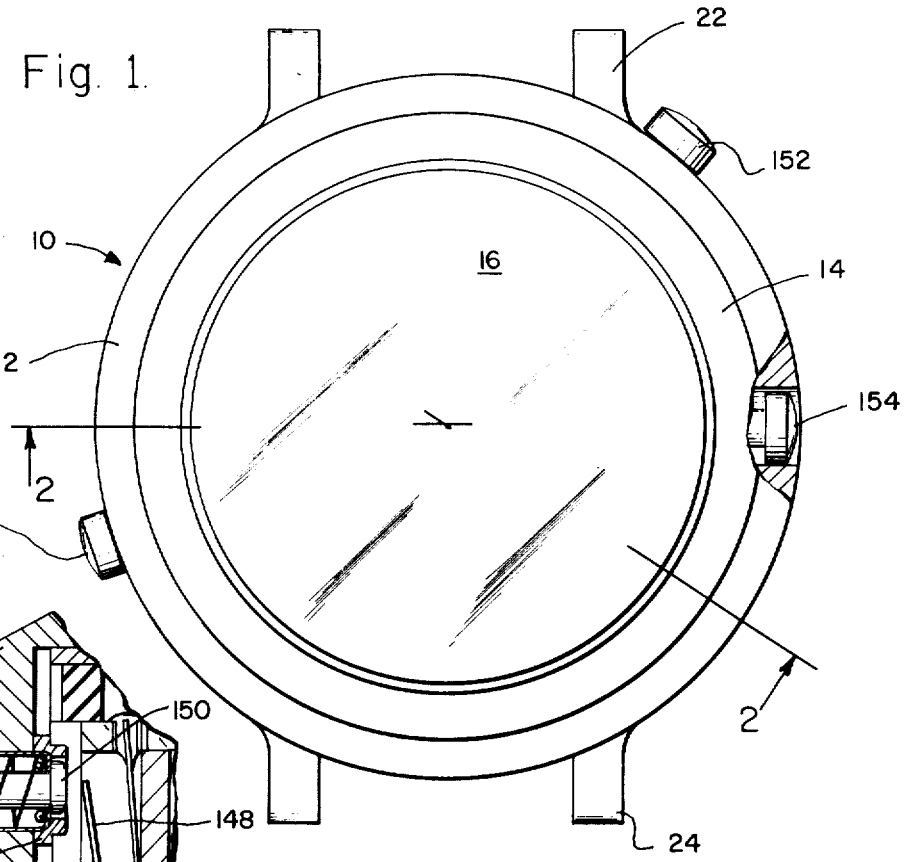
FIG. 1 is a top-plan view of an electronic watch having a structure in accordance with this invention.
Figure 2:
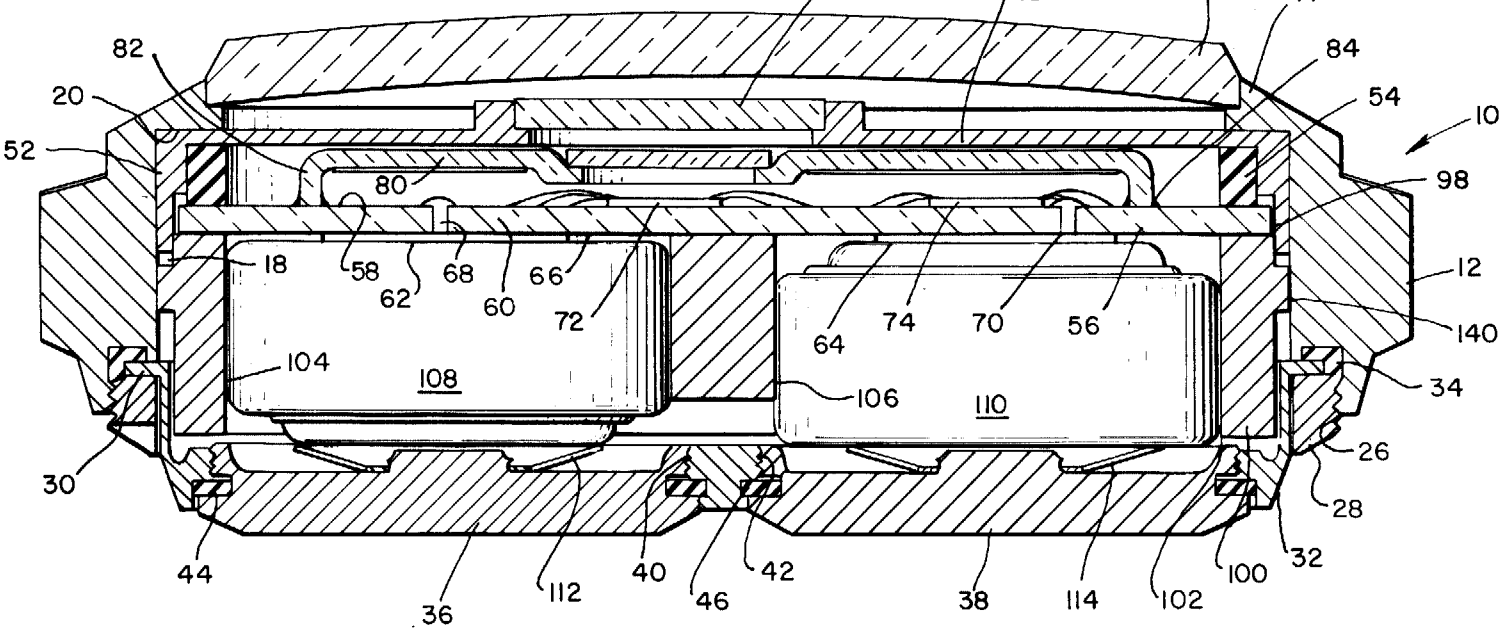
FIG. 2 is a section taken generally along line 2—2 of FIG. 1.
Figure 4:
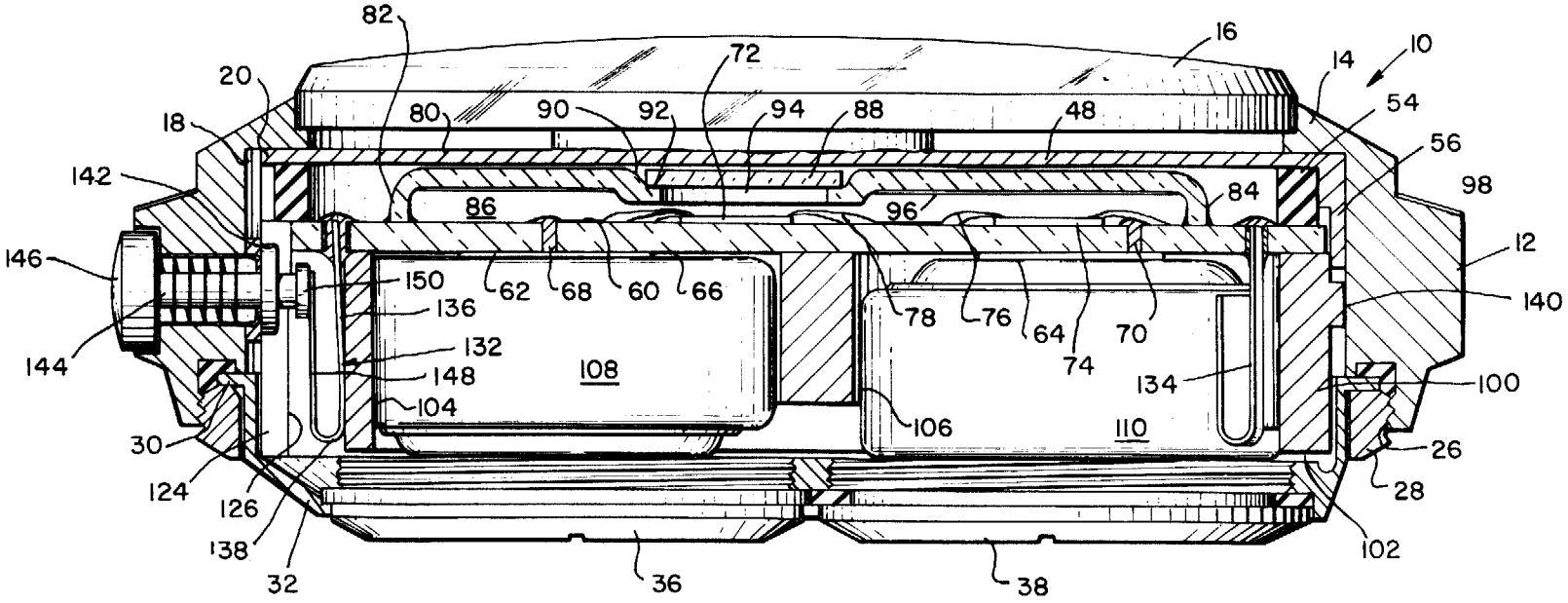
FIG. 4 is a section through the watch construction taken along the line 4—4 of FIG. 3.

The watch of this invention is generally indicated at 10 in FIGS. 1, 2 and 4. Watch 10 has a conventional case 12 which includes a bezel 14 which holds crystal 16. Interiorly, the watchcase 10 has an interior bore 18 which presents a cylindrical wall open to the back of the watchcase and a shoulder 20 beneath the bezel. Case 12 is provided with ear sets 22 and 24 of conventional construction for the attachment of a watchband. Alternatively, a ring for the attachment of a watch fob can be employed if the case is to be employed in pocket-watch service.

The rear of the case has screw threads 26 circumferentially in a recess therein, to the rearward of bore 18 and of larger diameter. Screw threads 26 receive lock ring 28 which thrusts the outwardly extending flange 30 of back 32 into metal-to-metal engagement with the main sidewall of the watchcase. Sealing ring 34 is compressed in this clamping operation to provide hermetic seal at that joint. This construction permits the back 32 to be installed without rotation. Preferably, a key is provided so that the back installs in only one particular relative angular position. If desired, another installation method, such as a snap-in arrangement could be used, providing adequate sealing is achieved. Battery hatch covers 36 and 38 are respectively screwed into battery hatch openings which have mating screw threads 40 and 42. Seal rings 44 and 46 are clamped between the hatch covers to provide the desired hermetic sealing. Metal-to-metal contact between the hatch covers and the back is accomplished through the screw threads.

Within watchcase 12, dial plate 48 is positioned within bore 18 and engages against shoulder 20. Dial plate 48 can carry any convenient ornamental figuration, but at least the center must have a window therethrough to permit the lighted time signal to be seen. Window 50 is illustrated. Dial plate 48 is generally in the shape of a disc occupying the space beneath crystal 16 and engaging against shoulder 20. A downwardly directed cylindrical flange 52 engages in bore 18. Engaged against the interior of dial plate 48 is resilient ring 54. Ring 54 is for the purpose of resilient mounting. It is preferably of elastomeric material such as rubber of a synthetic polymer composition material having rubber-like characteristics.

Mounted against resilient ring 54 is substrate 56. Substrate 56 is a suitable insulative substrate for the carrying of printed circuitry thereon. It is fairly rigid and inert. A ceramic material substrate is preferred, although filled synthetic polymer composition material substrates such as fiberglass filled phenolic is suitable. Substrate 56 has a front 58 on which is carried printed circuit interconnections, one of which is indicated at 60. Furthermore, printed circuitry, such as circuits 62 and 64 which serve as battery contact pads, can be located on the back 66 of the substrate. Through connections, such as those indicated at 68 and 70, can be provided through the substrate to interconnect the printed circuitry on the opposite sides. These are conventionally accomplished by means of providing a hole through the substrate, plating it, and then filling it with solder to interconnect circuitry on both sides.

The most important components on the front of this substrate comprise first the device which is visible to indicate the signal output from the watch. In the present case, a light-emitting diode 72 is located beneath window 50. The light-emitting diode is configured so that, upon proper energization, it emits light corresponding to a particular predetermined pattern. By energizing the proper pattern groups, intelligible displays, such as numbers, can be created and read. It is the display of the light-emitting diode 72 that provides the visible indication of the time indicated by the watch movement. While a light-emitting diode is indicated to be the preferred display device, other light-emitting devices, or selectively visible devices such as liquid crystal displays, are also feasible to use.

Also mounted upon the front of substrate 56 is integrated circuit chip 74. The chip 74 is secured in place by adhesive and is connected by wires soldered between the pads on the integrated circuit chip and the printed circuit wiring. These interconnecting wires are shown as 76, and similar wires 78 connect the light-emitting diode to the printed circuitry. The integrated circuit chip is conventionally a metal oxide silicon integrated circuit chip, and may be of the complementary type having both P-channel and N-channel transistors therein. The CMOS integrated circuits are the present-day most satisfactory circuits. For the sake of manufacturing convenience and economy, the integrated circuit chip 74 is not encapsulated, but is secured bare on the top of the substrate.

In order to provide hermetic sealing for the printed circuitry on the front of the substrate, for the light-emitting diode mounted thereon, and for the integrated circuit chip 74 mounted thereon, cover 80 is mounted thereover. Cover 80 is preferably in the form of a disc having a circular down-turned flange 82. The lower edge of the flange 82 is in direct contact with the front 58 of substrate 56. The circular flange is hermetically sealed thereto by means of adhesive 84 or other convenient sealant. Before sealing is accomplished, the volume above the substrate is appropriately treated to create a hermetically sealed zone 86 above the active components secured to the substrate. This zone may be filled with a suitable inert gas or the like to provide an optimum condition for the environment for the light-emitting diode, the printed circuit and the integrated circuit chip, without the need for other types of encapsulation or protection from atmospheric or mechanical damage. It is to be noted that the substrate within the area defined by flange 82 is a closed wall. There are no openings therethrough which are not filled with sealant of one type or another. For example, the solder-filled through holes are closed, as far as hermetic sealing is concerned. It is for the reason that the substrate serves as one wall of the hermetically sealed zone that a ceramic or other inorganic substrate is preferred to one that contains organics.

In order to permit light-emitting diode 72 to be visually observed through crystal 16, window 88 is provided over the light-emitting diode 72. Window 88 is inserted into a recess 90 which is defined on the bottom by a depressed flange 92. Opening 94 in the depressed flange defines the area through which light can enter from the exterior ambient conditions into hermetically sealed zone 86. In order to limit the amount of light which can reach chip 74, the opening 94 is positioned over light-emitting diode 72. Window 88 is adhesively sealed against flange 92 to maintain the hermetically sealed character of zone 86. The light-emitting diode 72 emits light of particular wavelength. In the case where the wavelength is principally red, window 88, window 50 or preferably crystal 16 is formed of transparent material having filter characteristics which preferentially passes the wavelength of the light-emitting diode. For example, when the principal wavelength is red, the filter color is red. In those cases where the front of dial plate 48 carries figuration of interest, the filter can be in window 88 or window 50. In the case where the face of dial plate 48 has nothing of significance or ornamental interest thereon, crystal 18 can be of filter material so that the entire front of the crystal gives a uniform appearance. The filter characteristics of the crystal or one of the windows reduces the light passing through opening 94 into the hermetically sealed area.

Some integrated circuit chips, and particularly MOS chips and CMOS chips, are sensitive to light. In the case of watch 10, if it was taken into the direct sunlight, even with a suitable filter in one of the windows, sufficient light may enter the hermetically sealed zone so that it would photon-activate the integrated circuit chips 78, or other similar chips on the substrate, to render the watch logic inaccurate. Thus, the interior of cover 80 is coated with a nonreflective coating, at least over integrated circuit chip 74. Thus, coating layer 96 is a surface treatment at least over the chip and preferably over the entire interior surface of cover 80, except for the window. Coating layer 96 is preferably of such character as to absorb a maximum amount of the actinic energy or photons which enter into the hermetically sealed space. Thus, a mat or flat black surface finish is preferable. As illustrated, the coating layer extends over the entire flat interior surface of the cover, so that light entering opening 94 is sufficiently absorbed and nonreflected by coating layer 96 so that insufficient photons impinge the integrated circuit chip 74 and its companion chips if any, so that their logic is not interfered with by photon activity. In this way, the integrated circuit chips can be directly attached to the substrate without individual encapsulation.

Substrate 56 fits within the flange 52 of dial plate 48. It is of smaller than the flange so that there is spacing between the outer wall 98 of the substrate and the interior of the flange. In this way, the substrate has a certain amount of lateral freedom within the case. In this sense, lateral freedom is in the direction generally of the plane of the substrate and in the general flat direction of watch 10, and perpendicular to a normal line through the watchcase.

Figure 3:
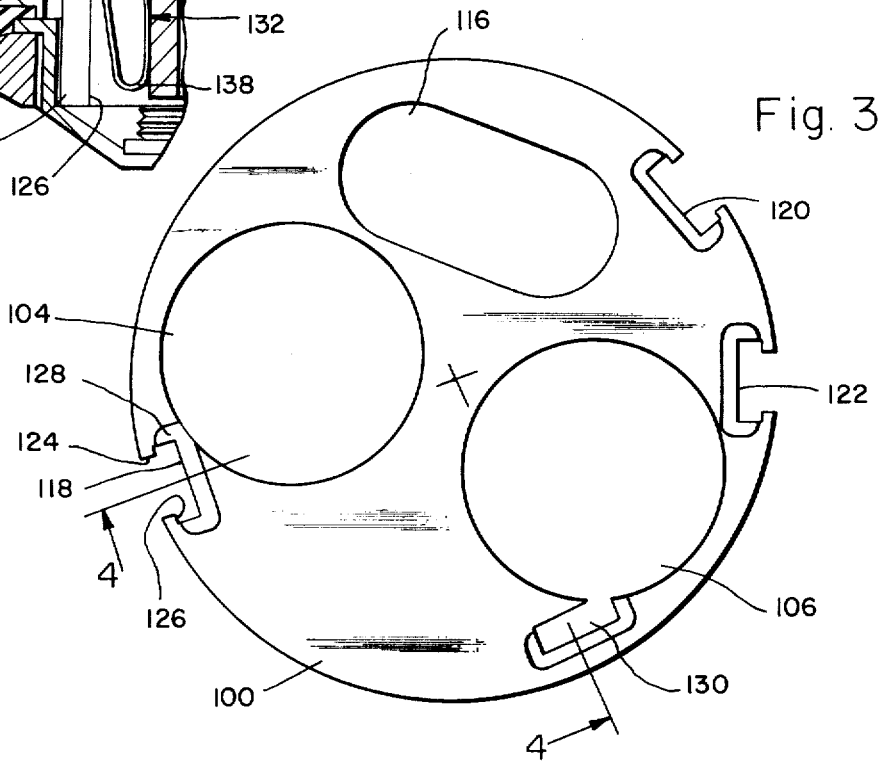
FIG. 3 is a top plan view of the spacer block on the interior of the structure.

FIG. 3 illustrates spacer block 100 which engages beneath the substrate, as seen in FIGS. 2 and 4. The height of spacer block 100 is such that it does not quite reach from substrate 56 down to watchback 32. Thus, the substrate 56 is not rigidly supported from the watchback. A space 102 is present. Spacer block 100 has two circular openings 104 and 106 therein. These openings receive batteries 108 and 110, respectively. As is seen in FIG. 2, battery springs 112 and 114 respectively engage upon the bottom of batteries 108 and 110 to thrust the batteries upward. The batteries respectively contact battery pads on the underside of the substrate, represented by printed circuit 62 and 64, respectively. The battery springs thus urge the batteries up into engagement with the substrate 56 which, in turn, is urged upward against the resilient ring 54. Thus, in a normal direction, the substrate is resiliently supported between the battery springs and the resilient ring 54. Thus, resilient support in that direction reduces the shock loading on the substrate due to normal shock applied to the watchcase.

Spacer block 100 also has opening 116 therein. This opening receives one or more components extending down from the bottom or backside of the substrate. In the particular case, an oscillator crystal is mounted upon the back of the substrate and extends into this opening. Spacer block 100 is preferably of synthetic polymer composition material which can be suitably molded. It can be a polycarbonate or a glass-loaded phenolic. Any other conveniently moldable material having suitable dimensional characteristics and high dielectric strength is suitable.

Three tee slots 118, 120 and 122 are molded around the periphery of spacer block 100. Tee slot 118 is shown at the left side of the section of FIG. 4. Tee slot 118 extends from top to bottom through the spacer block. It includes radial slot walls 124 and inwardly facing shoulders 126. Furthermore, the top of the tee slot is chamfered at 128 to provide clearance at the upper face of the spacer block around the tee slots where the spacer block engages against the bottom of the substrate 56.

A similar slot 130 is formed through spacer block 100, away from the outer peripheral edge thereof, but intersecting with the circular opening of battery bore 106.

Figure 5:
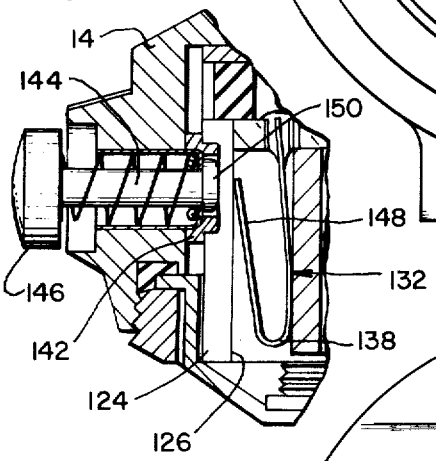
FIG. 5 is a partial section, showing generally the leftend structure of FIG. 4, with the push-button unactuated.

Four identical J-shaped springs are secured in the substrate and extend downwardly therefrom. Two of these springs are illustrated in FIGS. 4 and 5 at 132 and 134. The springs 132 and 134 respectively engage down into slots 118 and 130. Each of the four springs is arranged with its longer or shank end 136 rigidly mounted on substrate 56. The springs are mounted upon the substrate so that the unstressed angle is such that the U-bend 138 extends inwardly toward the median line of the watch and in such a direction that it is urged toward the bottom of its respective slot. Thus, substrate 56 is ressiliently mounted in a lateral direction with respect to spacer block 100. Spacer block 100 has a shoulder 140 which fairly closely fits within bore 18 so that it is laterally fixed with respect to the watchcase. Thus, the substrate is resiliently mounted in the lateral direction with respect to the spacer block and the watchcase. Rotation of the spacer block within the watchcase is prevented by the nose 142 of push-button assembly 144 engaging between the radial walls 124. When the push-button 146 is not depressed, the free end 148 of spring 132 rests against inwardly facing shoulders 126 so that the electrical contact 150 on the front of the plunger of the push-button assembly is out of contact with the spring. On the other hand, when the push-button is depressed as is shown in FIG. 4, electrical continuity is achieved between the push-button assembly and the free end 148 of the spring. Thus, each of the springs accomplishes the double objective of resilient mounting of the substrate and electrical contact therewith. The upper end of the spring on the substrate is electrically connected to the circuitry of the watch movement. The push-button assemblies associated with slots 118 and 120 are seen at 144 and 152 in FIG. 1. These are easily accessible push-buttons which extend from the watchcase. Push-button assembly 154 is not to be inadvertently used and thus is flush with the exterior of the case when not actuated. When any one of these push-buttons is pressed, the intermediate voltage found in the watchcase by virtue of battery springs 112 and 114 is connected to an appropriate point in the integrated circuit.

In the structure described, the preferable circuit is an electronic oscillator circuit powdered by the batteries with a suitable frequency divider and memory so that a signal corresponding to the present time in day number, hours, minutes and seconds is stored and updated. When push-button 152 is pressed, the hour and minute signal is displayed upon the light-emitting diode 72. When the push-button 144 is pressed to provide the corresponding electrical connection to the printed circuit on the substrate, the light-emitting diode provides a signal corresponding to the number of the day of the month. When both the push-buttons 144 and 152 are depressed, the signal emitted corresponds to the time in seconds. Push-button 154 is employed for setting the watch. As is seen in FIG. 4, spring 134 engages with the side of battery 110 to provide the intermediate voltage continuously to another portion of the circuit on the substrate. Thus, resilient mounting of the substrate with respect to the watchcase is accomplished, together with proper location of the substrate, as well as the required electrical contact.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

We claim:

[1. An electronic watch;

said electronic watch having a case and a crystal mounted on the front of said case, said case having an axis extending through said crystal and normal to the body of said case;

a substrate within said case, an electronically controlled display device for digitally displaying the time signal of said electronic watch, said substrate carrying said display device;

said case having an opening therein below said crystal;

the improvement comprising:

said substrate being radially and axially smaller than said opening within said case so that said substrate can move with respect to said case, said substrate having a face, a back, and a side, a first resilient body on the face of said substrate between said substrate and said case and a second resilient body between said substrate and said case on said side of said substrate for permitting axial motion of said substrate with respect to said case by resilient deflection of said resilient body, said second resilient body comprising a spring finger.]

[2. The electronic watch of claim 1 wherein said first resilient body comprises an elastomeric body positioned between said substrate and said case.]

[3. The electronic watch of claim 1 wherein a battery is positioned to axially thrust against said substrate and said second resilient body comprises a metallic spring engaged between said battery and said case, said spring being stressed to urge said battery axially to thrust said substrate against said elastomeric body.]

4. [The electronic watch of claim 1 wherein] *An electronic watch;*

*said electronic watch having a case and a crystal mounted on the front of said case, said case having an axis extending through said crystal and normal to the body of said case;*

*a substrate within said case, an electronically controlled display device for digitally displaying the time signal of said electronic watch, said substrate carrying said display device;*

*said case having an opening therein below said crystal;*

*the improvement comprising:*

*said substrate being radially and axially smaller than said opening within said case so that said substrate can move with respect to said case, said substrate having a face, and a back, a first resilient body on the face of said substrate between said substrate and said case and a second resilient body between said substrate and said case on said back of said substrate for permitting axial motion of said substrate with respect to said case by resilient deflection of said resilient body, said second resilient body comprising a battery spring;* said substrate [has] *also having* a plurality of *radially positioning* springs between said substrate and said case to radially urge said substrate to a central position with respect to said case.

5. [The electronic watch of claim 4 wherein] *An electronic watch;*

*said electronic watch having a case and a crystal mounted on the front of said case, said case having an axis extending through said crystal and normal to the body of said case;*

*a substrate within said case, an electronically controlled display device for digitally displaying the time signal of said electronic watch, said substrate carrying said display device;*

*said case having an opening therein below said crystal;*

*the improvement comprising:*

*said substrate being radially and axially smaller than said opening within said case so that said substrate can move with respect to said case, said substrate having a face, and a back, a first resilient body on the face of said substrate between said substrate and said case and a second resilient body between said substrate and said case on said back of said substrate for permitting axial motion of said substrate with respect to said case by resilient deflection of said resilient bodies, said second resilient body comprising a battery spring;*

*a plurality of radially positioning springs;* a spacer block [is] positioned within said case, *said substrate being mounted on said spacer block,* said spacer block having a battery opening therein for reception of a battery for powering said electronic watch, said spacer block being substantially fixed in a radial direction within said case with respect to said case, said *radially positioning* springs being interconnected between said substrate and said spacer block for radially resiliently positioning said substrate with respect to said spacer block and thus with respect to said case to provide radial resiliency of said substrate with respect to said case.

6. The electronic watch of claim 5 wherein electronic circuitry for controlling said display device is mounted upon said substrate and said radial spacer block-engaging springs are mounted upon said substrate and electrically connected to said circuit.

7. The electronic watch of claim 6 further including a movable switch member mounted on said case for manual engagement from the exterior of said case, said switch member being positioned with respect to one of said radial substrate-positioning springs to engage said spring upon manual actuation to [made] *make* electric contact with respect to said circuitry on said substrate.

8. [The electronic switch of claim 3 wherein] *An electronic watch;*

*said electronic watch having a case and a crystal mounted on the front of said case, said case having an axis extending through said crystal and normal to the body of said case;*

*a substrate within said case, an electronically controlled display device for digitally displaying the time signal of said electronic watch, said substrate carrying said display device;*

*said case having an opening therein below said crystal;*

*the improvement comprising:*

*said substrate being radially and axially smaller than said opening within said case so that said substrate can move with respect to said case, said substrate having a face and a back, a first resilient body on the face of said substrate between said substrate and said case, said first resilient body comprising an elastomeric body, and a second resilient body between said substrate and said case on said back of said substrate for permitting axial motion of said substrate with respect to said case by resilient deflection of said resilient body, said second resilient body comprising a metallic battery spring;* a spacer block is positioned within said case, said spacer block having a battery opening therein for reception of a battery for powering said electronic watch,

*a battery positioned in said battery opening of said spacer block, said battery being engaged by said battery spring, said spring being stressed to urge said battery axially to thrust said substrate against said elastomeric body,* said spacer block being substantially fixed in a radial direction within said case with respect to said case, a plurality of springs being mounted between said substrate and said spacer block for radially resiliently positioning said substrate with respect to said spacer block and thus with respect to said case to provide radial resiliency of said substrate with respect to said case.

9. [The electronic watch of claim 8 wherein] *An electronic watch;*

*said electronic watch having a case and a crystal mounted on the front of said case, said case having an axis extending through said crystal and normal to the body of said case;*

*a substrate within said case, an electronically controlled display device for digitally displaying the time signal of said electronic watch, said substrate carrying said display device;*

*said case having an opening therein below said crystal;*

*the improvement comprising:*

*said substrate being radially and axially smaller than said opening within said case so that said substrate can move with respect to said case, said substrate having a*

*face, and a back, a first resilient body on the face of said substrate between said substrate and said case and a second resilient body between said substrate and said case on said back of said substrate for permitting axial motion of said substrate with respect to said case by resilient deflection of said resilient bodies, said second resilient body comprising a battery spring;* a spacer block positioned within said case, said spacer block having a battery opening therein for reception of a battery for powering said electronic watch, said spacer block being substantially radially fixed in said case with respect to said case, a plurality of springs mounted between said substrate and said spacer block for radially resiliently positioning said substrate with respect to said spacer block and thus with respect to said case to provide radial resiliency of said substrate with respect to said case;

*a battery positioned in said battery opening in said spacer block to axially thrust against said substrate, said second resilient body comprising a metallic spring engaged between said battery and said case, said spring being stressed to urge said battery axially to thrust said substrate against said first resilient body; and* electronic circuitry for controlling said display device [is], mounted upon said substrate and said radial spacer block-engaging springs [are] *being* mounted upon said substrate and electrically connected to said circuit.

10. The electronic watch of claim 9 further including a movable switch member mounted on said case for manual engagement from the exterior of said case, said switch member being positioned with respect to one of said radial substrate-positioning springs to engage said spring upon manual actuation to make electric contact with respect to said circuitry on said substrate.

11. An electronic watch comprising:

a case having a face, a back, a side, and an axis extending substantially normal to said watchcase through said front and said back of said case;

a substrate within said case;

an optical horological display mounted with respect to said substrate to be visible through said face in said case, electronics mounted on said substrate and connected to said display to control the horological information displayed thereon;

a spring finger connected to said electronics and mounted upon said substrate and positioned adjacent said side of said case;

a switch member mounted on said side of said case for motion with respect to said case for manual actuation from an unactuated to an actuated position, said switch member moving into contact with said spring finger upon actuation thereof for manually applying an electrical signal to said electronic circuit.

12. The electronic watch of claim 11 wherein there are a plurality of dependent spring fingers, each of said plurality being connected to said electronic circuit.

13. The electronic watch of claim 12 wherein a battery is positioned within said case for powering said electronic circuit, one of said spring fingers being in contact with said battery to connect battery potential to said electronic circuit.

14. The electronic watch of claim 12 wherein there are a plurality of manually operable switch members, and each of said plurality of manually operable switch members is associated with a different spring finger so that each of said plurality of switch members makes electrical connection to said electronic circuit upon manual actuation of said switch member.

15. The electronic watch of claim 11 wherein said substrate is radially movable within said watchcase and said spring finger engages with respect to said watchcase to urge said substrate to a centered position with respect to said watchcase.

16. The electronic watch of claim 15 wherein a spacer is positioned in said watchcase and is substantially radially fixed with respect to said watchcase and said spring finger engages said spacer.

17. The electronic watch of claim 16 wherein there is a plurality of spring fingers and there is a battery opening in said spacer and one of said spring fingers engages into said battery opening to connect battery voltage to said electronic circuit.

18. The electronic watch of claim 17 wherein there is a plurality of manually operable switch members and each of said spring fingers is J-shaped and has a shank end rigidly mounted into said substrate and has a free end engageable by a switch member.

*19. An electronic watch structure comprising:*

*a substrate having an optical horological display mounted thereon, horologically related electronics mounted on said substrate and connected to said display to control the horological information displayed thereon;*

*a spacer block having a periphery and a face, said substrate lying against said face of said spacer block, an opening in said spacer block away from said periphery of said spacer block, said opening having an inwardly facing shoulder surface positioned away from said periphery and a passage extending between said shoulder surface and said periphery;*

*a resilient member positioned in said opening and electrically connected to said electronics on said substrate so that said resilient member is restrained from moving towards said periphery by said inwardly facing shoulder surface in said opening.*

*20. The electronic watch structure of claim 19 further having a watch case in combination therewith, said substrate and said spacer block being positioned within said watch case and said optical horological display being visible out of said watch case;*

*a switch member mounted in the side of said case for manual actuation from an unactuated to an actuated position, said switch member moving into contact with said resilient electrically conductive member upon actuation thereof for manually applying an electric signal to said electronic circuit on said substrate.*

*21. An electronic watch structure comprising:*

*a substrate having an optical horological display mounted thereon, horologically related electronics mounted on said substrate and connected to said display to control the horological information displayed thereon;*

*a spacer block having a periphery and a face, said substrate lying against said face of said spacer block, a tee slot on said periphery of said spacer block, said tee slot having an inwardly facing shoulder positioned away from said periphery and the slot of said tee slot extending between said shoulder and said periphery;*

*a resilient member positioned in said tee slot and directly connected to said electronics on said substrate, said resilient member engaging against said shoulder so that said resilient member is restrained from moving*

*toward said periphery by said inwardly facing shoulder of said tee slot.*

*22. The electronic watch structure of claim 21 further having a watch case in combination therewith, said substrate and said spacer block being positioned within said watch case and said optical horological display being visible from out of said watch case;*

*a switch member mounted in the side of said case for manual actuation from an unactuated to an actuated position, said switch member moving into contact with said resilient electrically conductive member upon actuation thereof for manually applying an electric signal to said electronic circuit on said substrate.*

*23. The electronics watch structure of claim 21 wherein said resilient member is a J shaped spring having a shank end mounted onto said substrate and electrically connected to circuitry on said substrate and having its free end engaging against said inwardly facing shoulder of said tee slot.*

*24. An electronic watch structure comprising:*

*a spacer block having a periphery, an optical horological display and horologically related electronics mounted with respect to said spacer block and connected to said display to control the horological information displayed thereon, an opening in said spacer block away from said periphery thereof, said opening having an inwardly facing shoulder surface positioned away from said periphery and a passage extending between said shoulder surface and said periphery;*

*a resilient member positioned in said opening and electrically connected to said electronics so that said resilient member is restrained from moving towards said periphery by said inwardly facing shoulder surface adjacent said opening.*

*25. The electronic watch structure of claim 24 further having a watch case in combination therewith, said spacer block being positioned within said watch case and said optical horological display being visible out of said watch case;*

*a switch member mounted in the side of said case for manual actuation from an unactuated to an actuated position, said switch member moving into contact with said resilient electrically conductive member upon actuation thereof for manually applying an electric signal to said electronic circuit on said substrate.*

*26. The electronic watch structure of claim 24 wherein said spacer block further includes a battery opening in said spacer block; and*

*a battery side contact spring electrically connected to said electronics and extending into said battery opening for contact with the case of a battery in said battery opening.*

* * * * *